(12) United States Patent
Fong et al.

(10) Patent No.: US 7,551,588 B2
(45) Date of Patent: Jun. 23, 2009

(54) AUTONOMOUS MODE TRANSMISSION FROM A MOBILE STATION

(75) Inventors: Mo-Han Fong, L'Orignal (CA); Jun Li, Richardson, TX (US); Sophie S. Vrzic, Nepean (CA); Ali Iraqi, Kanata (CA)

(73) Assignee: Nortel Networks Limited, St. Laurent, Quebec (CA)

( * ) Notice: Subject to any disclaimer, the term of this patent is extended or adjusted under 35 U.S.C. 154(b) by 811 days.

(21) Appl. No.: 10/793,056

(22) Filed: Mar. 4, 2004

(65) Prior Publication Data

US 2004/0229604 A1 Nov. 18, 2004

Related U.S. Application Data

(60) Provisional application No. 60/452,370, filed on Mar. 6, 2003, provisional application No. 60/454,714, filed on Mar. 15, 2003, provisional application No. 60/457,215, filed on Mar. 25, 2003, provisional application No. 60/459,534, filed on Apr. 1, 2003, provisional application No. 60/462,220, filed on Apr. 11, 2003, provisional application No. 60/468,442, filed on May 6, 2003, provisional application No. 60/469,106, filed on May 9, 2003, provisional application No. 60/469,778, filed on May 12, 2003, provisional application No. 60/475,440, filed on Jun. 3, 2003, provisional application No. 60/478,792, filed on Jun. 16, 2003, provisional application No. 60/495,544, filed on Aug. 15, 2003, provisional application No. 60/499,584, filed on Sep. 2, 2003.

(51) Int. Cl.
*H04B 7/216* (2006.01)
*H04J 3/16* (2006.01)

(52) U.S. Cl. ...................................... 370/335; 370/465

(58) Field of Classification Search .................. 370/468, 370/341, 320–321, 331–332, 328, 330, 395.4, 370/329, 335, 349; 455/522, 452.2, 422.1, 455/439, 453, 13.4, 436, 452.1
See application file for complete search history.

(56) References Cited

U.S. PATENT DOCUMENTS

| | | | |
|---|---|---|---|
| 5,914,950 A | 6/1999 | Tiedemann, Jr. et al. | |
| 5,923,650 A * | 7/1999 | Chen et al. | 370/331 |
| 6,510,148 B1 * | 1/2003 | Honkasalo | 370/342 |
| 6,590,880 B1 * | 7/2003 | Maenpaa | 370/331 |
| 6,608,832 B2 * | 8/2003 | Forslow | 370/353 |

(Continued)

FOREIGN PATENT DOCUMENTS

EP 1 231 807 8/2002

(Continued)

*Primary Examiner*—Kwang B Yao
*Assistant Examiner*—Candal Elpenord
(74) *Attorney, Agent, or Firm*—Trop, Pruner & Hu, P.C.

(57) ABSTRACT

A wireless communications network includes a mobile station and base station communicating an indicator of an autonomous data rate supportable over a reverse wireless link between the mobile station and base station. The mobile station and base station also communicate a flag indicating whether autonomous is enabled for the mobile station. In response to the flag indicating that autonomous mode is enabled, data is communicated, over the reverse wireless link, at a data rate less than or equal to the autonomous data rate without the base station having to first schedule the mobile station.

22 Claims, 3 Drawing Sheets

U.S. PATENT DOCUMENTS

| | | | |
|---|---|---|---|
| 7,050,759 B2 * | 5/2006 | Gaal et al. | 455/67.13 |
| 7,068,683 B1 * | 6/2006 | Lundby et al. | 370/493 |
| 7,142,548 B2 * | 11/2006 | Fong et al. | 370/395.4 |
| 7,366,533 B2 * | 4/2008 | Biggs et al. | 455/509 |
| 2002/0015388 A1 | 2/2002 | Kim et al. | |
| 2002/0136286 A1 | 9/2002 | Koo | |
| 2002/0167927 A1 * | 11/2002 | Wada et al. | 370/338 |
| 2002/0172217 A1 * | 11/2002 | Kadaba et al. | 370/443 |
| 2002/0173311 A1 * | 11/2002 | Biggs et al. | 455/450 |
| 2002/0181410 A1 * | 12/2002 | Bae et al. | 370/252 |
| 2003/0119527 A1 * | 6/2003 | Labun et al. | 455/456 |
| 2003/0227869 A1 * | 12/2003 | Hsu et al. | 370/229 |
| 2004/0062206 A1 * | 4/2004 | Soong et al. | 370/252 |
| 2004/0160914 A1 * | 8/2004 | Sarkar | 370/329 |
| 2005/0003843 A1 * | 1/2005 | Ho et al. | 455/509 |
| 2006/0264220 A1 * | 11/2006 | Chen et al. | 455/454 |

FOREIGN PATENT DOCUMENTS

| | | |
|---|---|---|
| EP | 1 257 140 | 11/2002 |
| WO | WO 02/36735 | 5/2002 |

\* cited by examiner

AUTONOMOUS MODE TRANSMISSION FROM A MOBILE STATION

CROSS-REFERENCE TO RELATED APPLICATION

This claims the benefit of U.S. Provisional Applications Ser. Nos. 60/452,370, filed Mar. 6, 2003; 60/454,714, filed Mar. 15, 2003; 60/457,215, filed Mar. 25, 2003; 60/459,534, filed Apr. 1, 2003; 60/462,220, filed Apr. 11, 2003; 60/468,442, filed May 6, 2003; 60/469,106, filed May 9, 2003; 60/469,778, filed May 12, 2003; 60/475,440, filed Jun. 3, 2003; 60/478,792, filed Jun. 16, 2003; 60/495,544, filed Aug. 15, 2003; and 60/499,584, filed Sep. 2, 2003, each of which is hereby incorporated by reference.

TECHNICAL FIELD

The invention relates generally to autonomous mode data transmission from a mobile station.

BACKGROUND

A mobile communications network is typically made up of a plurality of cells. Each cell includes a radio base station, with each base station connected to a mobile switching center or a packet service node that manages communications sessions between mobile stations and terminals coupled to a public switched telephone network (PSTN) or a packet-based data network. Communications between mobile stations and base stations are performed over wireless links.

Traditional wireless protocols provide for circuit-switched communications. Such protocols include time-division multiple access (TDMA) protocols and code-division multiple access (CDMA) protocols. In a circuit-switched network, a channel portion between two endpoints (e.g., two mobile stations) is occupied for the duration of the connection between the endpoints.

However, with the wide availability of the Internet and intranets, packet-switched communications (e.g., web browsing, electronic mail, and so forth) have become more common. Generally, a circuit-switched connection is an inefficient mechanism for communicating packet data. As a result, third generation (3G) and beyond wireless technologies are being developed and implemented to provide higher bandwidth and more efficient packet-switched communications (of data as well as voice and other forms of real-time data) over wireless networks.

One example of a packet-switched wireless technology is defined by the CDMA 2000 family of standards, developed by the Third Generation Partnership Project 2 (3GPP2). A CDMA 2000 wireless communications network is capable of supporting both circuit-switched services and packet-switched services. For TDMA, packet-switched wireless communications protocols have also been developed, such as the Enhanced General Packet Radio Service (EGPRS) protocol as defined by the 3GPP (Third Generation Partnership Project) UMTS (Universal Mobile Telecommunications System) Release 1999 Standard, and others.

Typically, for a mobile station to transmit packet data over a reverse link from the mobile station to a base station, the base station has to first schedule a traffic channel for the mobile station to send the desired data. For example, in a CDMA 2000 wireless communications network, packet data is carried in a reverse supplemental channel (R-SCH). A base station schedules an R-SCH for a mobile station to transmit packet data over the reverse wireless link. However, the requirement of scheduling is a relatively slow process, since signaling (request and grant signaling) has to be exchanged between the mobile station and the base station to perform the scheduling. The amount of time it takes for the mobile station and base station to exchange request and grant signaling adds to the overall delay in the transmission of packet data. The exchange of request and grant signaling also consumes valuable bandwidth in the air interface between mobile station and base station.

SUMMARY

In general, according to an embodiment, a method of communicating data in a wireless communications network includes communicating, between a mobile station and a base station, an indicator of an autonomous rate supportable over a reverse wireless link between the mobile station and base station. In addition, a flag indicating whether autonomous mode is enabled for the mobile station is communicated between the mobile station and the base station. In response to the flag indicating that autonomous mode is enabled, data is communicated over the reverse wireless link at a data rate less than or equal to the autonomous rate without the base station having to first schedule the mobile station.

Other or alternative features will become apparent from the following description, from the drawings, and from the claims.

DETAILED DESCRIPTION

In the following description, numerous details are set forth to provide an understanding of the present invention. However, it will be understood by those skilled in the art that the present invention may be practiced without these details and that numerous variations or modifications from the described embodiments may be possible.

Figure 1:
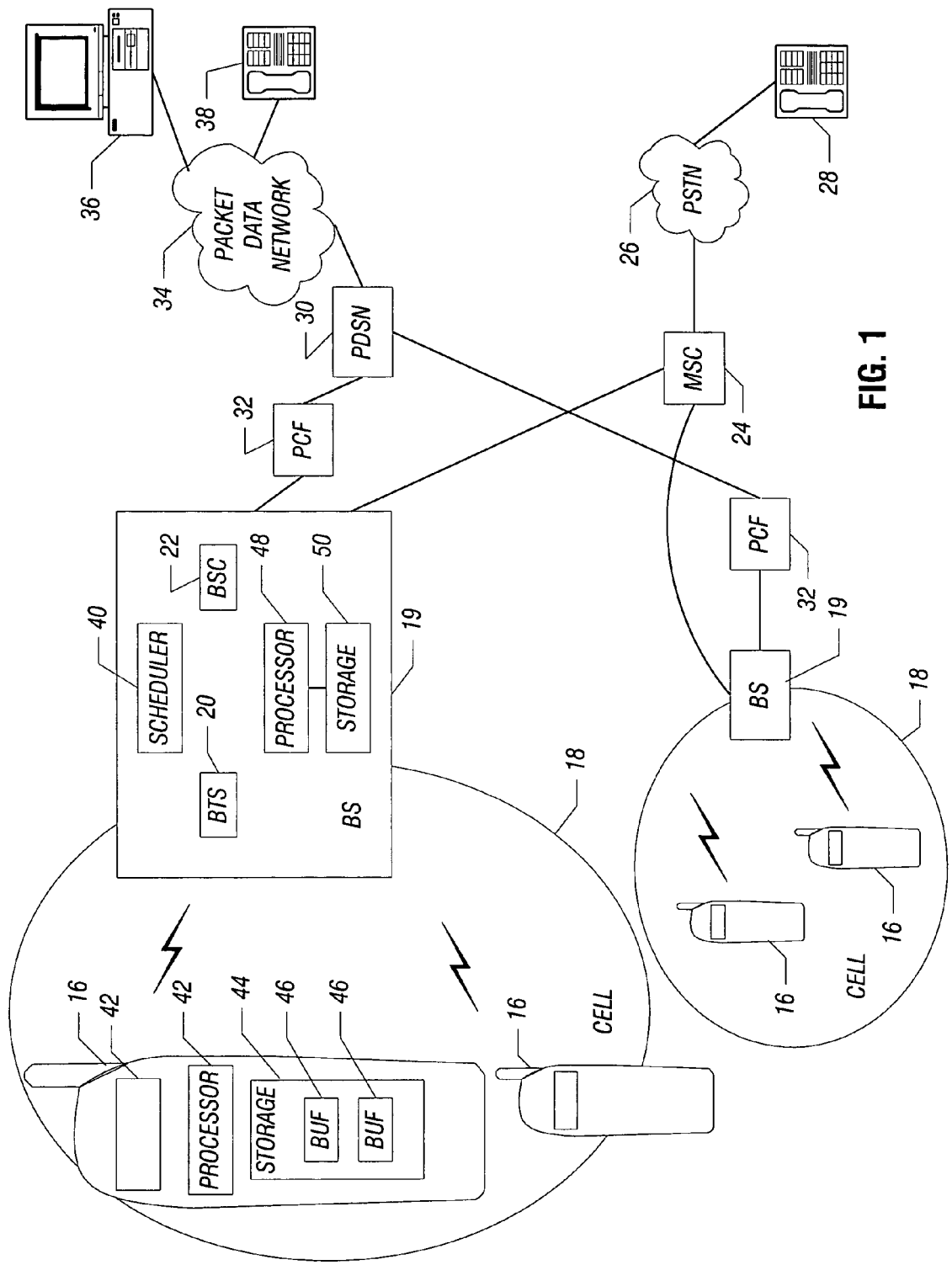
FIG. 1 is a block diagram of an example arrangement of a mobile or wireless communications network that incorporates an embodiment the invention.

Referring to FIG. 1, a wireless or mobile communications network according to one embodiment includes components that operate according to CDMA (code-divisional multiple access) 2000. CDMA 2000 is defined by the CDMA 2000 family of standards (including the TIA-2000 standards, TIA-2001 standards, and the TIA-2000-D standards). However, in other embodiments, other types of wireless protocols can be used for communications in the wireless communications network, including other versions of CDMA, TDMA protocols, UMTS (Universal Mobile Telecommunications System) protocols, and other protocols.

The wireless communications network includes multiple cells 18, each including a base transceiver subsystem (BTS) 20 for performing radio telecommunications with mobile stations within the coverage area of the cell 18. The BTS entities 20 are connected to one or more base station controllers (BSCs) 22. Collectively, a BTS 20 and BSC 22 are referred to as a "base station" 19. More generally, a "base station" refers to any entity (or collection of entities) that communicates wirelessly with mobile stations and that exchanges control signaling with the mobile stations for establishing, terminating, or otherwise managing communication sessions (e.g., circuit-switched call sessions, packet-switched voice call sessions, other packet-switched communications sessions, and so forth). Note that, in some implementations, multiple BTSs can be connected to each BSC.

For communicating circuit-switched voice traffic, the base station 19 is coupled to a mobile switching center (MSC) 24, which is responsible for switching mobile station-originated or mobile station-terminated circuit-switched traffic. Effectively, the MSC 24 is the interface for signaling and user traffic between the wireless network and other public switched networks (such as a public switched telephone network (PSTN) 26) or other MSCs. The PSTN 26 is connected to landline terminals, such as telephones 28.

In a voice call session between a mobile station (such as mobile station 16) and a landline terminal (such as telephone 28), voice traffic is routed through the air interface between the mobile station 16 and a base station 14, and through the base station 14, MSC 24, and PSTN 26.

The wireless communications network 10 also supports packet data services, in which packet data is communicated between a mobile station and another endpoint, which can be a terminal coupled to a packet data network 34 or another mobile station that is capable of communicating packet data. Examples of the packet data network 34 include private networks (such as local area networks or wide area networks) and public networks (such as the Internet). Packet data is communicated in a packet-switched communications session established between the mobile station and the other endpoint.

To communicate packet data, the base station 19 is coupled to a packet control function (PCF) module 32, which manages the relay of packets between the BSC 22 and a packet data serving node (PDSN) 30. The BSC 22 and PCF module 32 can be implemented on one platform or on multiple platforms. A "platform" generally refers to an assembly of hardware and software that provides predefined tasks.

The PDSN 30 establishes, maintains, and terminates link layer sessions to mobile stations, and routes mobile station-originated or mobile station-terminated packet data traffic. The PDSN 30 is coupled to the packet data network 34, which is connected to various endpoints, such as a computer 36 or a network telephone 38 (which is a telephone that is fitted with a network interface card for communications over packet data networks). Examples of packet-switched communications include web browsing, electronic mail, text chat sessions, file transfers, interactive game sessions, voice-over-IP (Internet Protocol) sessions, and so forth.

The wireless communications network thus provides two different types of communications: circuit-switched communications and packet-switched communications. Circuit-switched communications are routed through the MSC 24, while packet-switched communications are routed through the PDSN 30. In circuit-switched communications, a dedicated end-to-end channel is established for the duration of a call session. However, packet-switched communications utilize a connectionless intranetwork layer, such as that defined by the Internet Protocol (IP). In packet-switched communications, packets or other units of data carry routing information (in the form of network addresses) that are used to route the packets or data units over one or more paths to a destination endpoint.

One version of IP, referred to as IPv4, is described in Request for Comments (RFC) 791, entitled "Internet Protocol," dated September 1981; and another version of IP, referred to as IPv6, is described in RFC 2460, "Internet Protocol, Version 6 (IPv6) Specification," dated December 1998.

In the ensuing discussion, reference is made to the transmission of packet data by a mobile station. However, note that techniques according to some embodiments of the invention can also be applied to circuit-switched communications.

The base station 19 includes a scheduler 40 to schedule (in scheduled mode) transmission of data by the mobile station 16 over the respective reverse wireless links. Note that the scheduler 40 can be implemented in either the BTS 20 or the BSC 22, or both. In scheduling a mobile station for transmitting packet data, the scheduler 40 specifies a data rate, a start time, and duration through either layer 2 signaling or layer 3 signaling messages. If scheduled, a mobile station 16 is able to transmit data, including packet data, according to the specifications provided by the scheduler 40. This type of transmission by mobile stations is referred to as scheduled mode transmission.

However, in accordance with some embodiments of the invention, for certain types of data transmissions, the communication of data over the reverse wireless link can be performed according to an autonomous mode. The types of data transmissions that can benefit from autonomous mode transmission include data traffic that is delay-sensitive and stream-like (rather than bursty). For example, interactive gaming sessions over a packet data network involve streaming data that is delay-sensitive. Other types of data transmissions that can benefit from autonomous mode transmission include low-rate signaling traffic. Note, however, that autonomous mode transmission over a reverse wireless link is not to be limited to only the traffic mentioned above, but rather can be applied to any type of traffic.

In autonomous mode, a mobile station 16 containing data to transmit does not have to wait for the scheduler 40 in the base station 19 to schedule a channel for the mobile station 16. Instead, the mobile station 16 is able to autonomously send data over the reverse wireless link at a data rate that is less than or equal to a specified maximum autonomous data rate. Effectively, in autonomous mode, the mobile station 16 is able to transmit packet data at a data rate up to the maximum autonomous data rate without an explicit, scheduled rate assignment received in either layer 2 signaling or layer 3 signaling messages from the scheduler 40 in the base station 19.

The maximum autonomous data rate is specified by an indicator (in the form of a parameter) sent by the base station 19 to the mobile station 16. According to one implementation, the parameter is named REV_PDCH_MAX_AUTO_TPR$_S$, which refers to the maximum autonomous traffic-to-pilot ratio (TPR) on a reverse packet data channel (R-PDCH). R-PDCH is used for transmitting packet data from the mobile station over the reverse wireless link. The traffic-to-pilot ratio is used by the mobile station to calculate a corresponding data rate. A higher the traffic-to-pilot ratio implies a higher data rate.

Each mobile station 16 can be assigned a different REV_PDCH_MAX_AUTO_TPR$_S$ parameter. This enables the base station 19 to assign different maximum autonomous data rates to different mobile stations 16, if desired.

Another parameter that is sent from the base station 19 to the mobile station 16 regarding the autonomous mode of transmission is a flag to indicate whether autonomous mode is enabled. In one implementation, the flag is named REV_PDCH_AUTO_ALLOWED$_S$[i], where i is a service reference identifier (sr_id) to identify a service for which data is to be transmitted by the mobile station. For example, packet data that can be communicated by a mobile station 16 include packet data for a voice-over-IP service, a web browsing service, an e-mail service, a text chat service, a file download service, an interactive gaming service, and so forth. Multiple concurrent communications sessions for respective services can be set up by the mobile station 16. For each such service having a reference identifier sr_id$_x$, the state of REV_PDCH_AUTO_ALLOWED$_S$[sr_id$_x$] is set (to logical "1" to indicate that autonomous mode transmission is enabled for the service having reference identifier sr_id$_x$, and to logical "0" to indicate that autonomous mode transmission is disabled for the service having reference identifier sr_id$_x$). Thus, for example, autonomous mode may be enabled for an interactive gaming session, where the communication of data is relatively delay sensitive. On the other hand, autonomous mode may be disabled for a file download session or web browsing session, since these types of data communications are less delay sensitive.

The base station 19 is able to send autonomous mode parameters, including REV_PDCH_MAX_AUTO_TPR$_S$ and REV_PDCH_AUTO_ALLOWED$_S$[i], in various messages, which can be sent during a call setup procedure or at other times (such as after a call has been established and the mobile station is in an active state). According to one implementation, examples of such messages include an Extended Channel Assignment Message for assigning a channel to a mobile station. Another message is a Service Connect Message (SCM), sent to establish a service instance either at call setup or during a call. Another message that can carry the autonomous mode parameters mentioned above is a Universal Handoff Direction Message (UHDM), which is sent at any time during a call. In other implementations, other messages can be employed to carry the autonomous mode parameters. Such messages are sent in the forward wireless link from the base station to the mobile station.

Although reference is made to specific autonomous mode parameters in this discussion, it is noted that other autonomous mode parameters to define autonomous mode transmission over a reverse wireless link can be employed in other embodiments.

As further shown in FIG. 1, each mobile station 16 includes a processor 42 and a storage 44. The processor 42 provides a processing core on which one or more software modules are executable to enable the mobile station to perform various tasks. Also, the mobile station 16 includes buffers 46 for temporarily holding data that are to be communicated over the reverse wireless link to the base station 19. The base station 19 also includes a processor 48 and a storage 50 (or multiple processors and storages). The scheduler 40 can be a software module that is executable on the processor 48.

Figure 2:
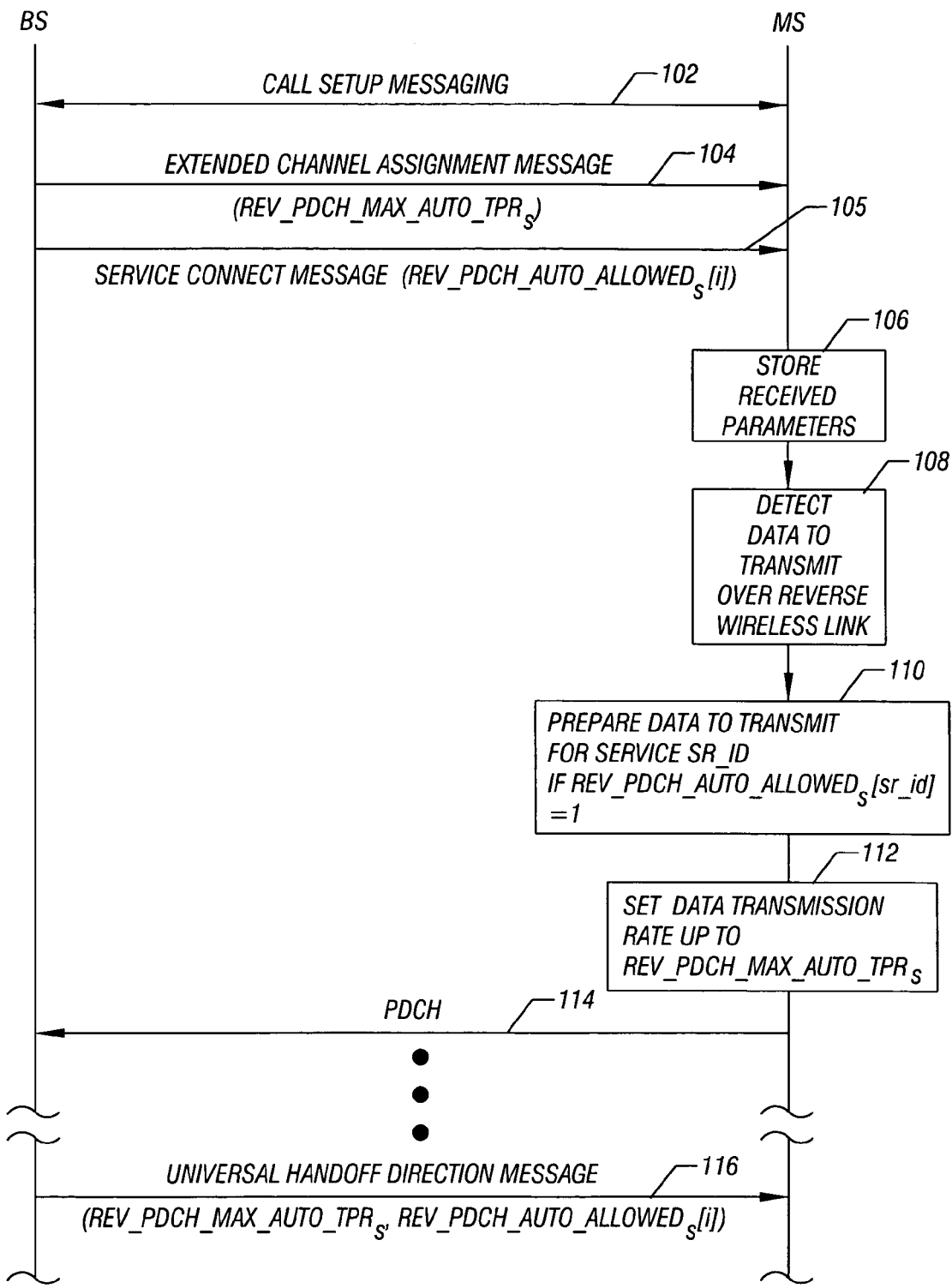
FIG. 2 is a message flow diagram of a procedure for enabling autonomous communication of data from the mobile station to the base station at a rate up to an maximum autonomous data rate, in accordance with an embodiment of the invention.

FIG. 2 illustrates a message flow diagram involving a base station and mobile station. Call setup messaging is initially exchanged (at 102) between the base station and the mobile station to establish a call. As part of call setup, the base station sends (at 104) an Extended Channel Assignment Message, which includes the REV_PDCH_MAX_AUTO_TPR$_S$ message, according to one implementation. Also, the base station sends (at 105) a Service Connect Message (SCM) to the mobile station. The Service Connect Message includes the REV_PDCH_AUTO_ALLOWED$_S$[i]. Note that the Service Connect Message can also be transmitted from the base station to the mobile station after call setup has completed. This is usually performed to establish new service instances (to provide additional services) between the mobile station and the base station. Call setup need only be performed once, with the mobile station being able to provide multiple services in one call session.

In other implementations, the REV_PDCH_MAX_AUTO_TPR$_S$ and REV_PDCH_AUTO_ALLOWED$_S$[i] messages can both be carried in the Extended Channel Assignment Message or in the Service Connect Message.

The received autonomous mode parameters are stored (at 106) by the mobile station 16. The mobile station 16 next detects (at 108) that it has packet data to transmit over the reverse wireless link. Packet data to be transmitted is stored in the buffers 46 (FIG. 1) of the mobile station 16. If the mobile station has established multiple sessions for multiple corresponding services, then the buffers 46 would contain packet data for the multiple sessions.

For each service having a corresponding service reference identifier sr_id$_x$, if REV_PDCH_AUTO_ALLOWED$_S$ [sr_id$_x$] has the logical "1" state, then packet data for that service is prepared for transmission (at 110) by the mobile station. The data transmission rate is set (at 112) at a rate up to REV_PDCH_MAX_AUTO_TPR$_S$. Note that the data rate that the mobile station actually transmits at can be limited by the status of the buffers (referred to as a buffer-limited data rate) or by power headroom (referred to as a power-limited data rate). The data is then sent (at 114) over a reverse packet data channel (R-PDCH). While the mobile station remains in its active state, the base station can send (116) additional messages to the mobile station to either change the value of REV_PDCH_MAX_AUTO_TPR$_S$ and REV_PDCH_AUTO_ALLOWED$_S$[i] for an existing service, or to set the value of REV_PDCH_MAX_AUTO_TPR$_S$ and REV_PDCH_AUTO_ALLOWED$_S$[i] for new services. As noted above, one such message is the Service Connect Message. Alternatively, the base station can send a Universal Handoff Direction Message (UHDM) to the mobile station, which is typically performed during a handoff procedure when the mobile station travels from one cell (or cell sector) to another cell (or cell sector).

In a different implementation, another message can be used to change the values of REV_PDCH_MAX_AUTO_TPR$_S$ and REV_PDCH_AUTO_ALLOWED$_S$[i]. For example, a message can be sent by the base station to the mobile station to increment or decrement the value of REV_PDCH_MAX_AUTO_TPR$_S$ by a predetermined amount. Another message can also be sent by the base station to the mobile station for toggling the state of REV_PDCH_AUTO_ALLOWED$_S$[i].

According to another embodiment, an optional flag that can be sent from the base station to the mobile station is an AUTONOMOUS_SP_ENABLE_FLAG parameter, which is set to either a logical "1" or logical "0" state. In one implementation, the AUTONOMOUS_SP_ENABLE_FLAG is communicated in one or more of the messages discussed above. If AUTONOMOUS_SP_ENABLE_FLAG is set to logical "1," then the mobile station 16 can transmit in autonomous mode up to the autonomous maximum data rate (REV_PDCH_MAX_AUTO_TPR$_S$) regardless of occupancy of the buffers 46 (FIG. 1) in the mobile station 16. However, if the AUTONOMOUS_SP_ENABLE_FLAG parameter is set to logical "0," then the mobile station transmits in autonomous mode up to the autonomous maximum data rate only when the buffer occupancy is smaller than or equal to a predetermined size. AUTONOMOUS_SP_ENABLE_FLAG being sent to logical "0" prevents the mobile station form transmitting in autonomous mode if there is too much data in the buffer to send. In this case, the mobile station will have to transmit the data in scheduled mode (by exchanging messaging with the scheduler 40 in the base station 19 to schedule an R-PDCH for transmitting the data over the reverse wireless link).

Because mobile stations are able to transmit autonomously in accordance with some embodiments, a base station 19 is unable to directly control through the use of data rate assignment messages the loading of the reverse wireless link. Therefore, according to an embodiment, a mechanism that takes into account the autonomous transmitting capability of mobile stations is provided to enable the scheduler 40 in the base station 19 to efficiently schedule usage of the air interface between mobile stations and the base station.

A mobile station not scheduled by the base station can transmit autonomously up to the maximum autonomous data rate, subject to the certain rules as described below in connection with FIG. 3. A reverse request channel, referred to as R-REQCH, is sent in the reverse wireless link from the mobile station to the base station to indicate the maximum data rate that is supportable by the mobile station. This maximum supportable data rate information that is communicated in R-REQCH is used by the scheduler 40 to determine how much bandwidth is available for other communications (such as for other mobile stations). A fixed time offset T2 is defined between the R-REQCH frame boundary (e.g., boundary 202) and the frame boundary of R-PDCH (e.g., boundary 204). In other words, the R-REQCH information has to be communicated from the mobile station to the base station at least a time T2 prior to the mobile station actually transmitting the packet data over R-PDCH.

Figure 3:
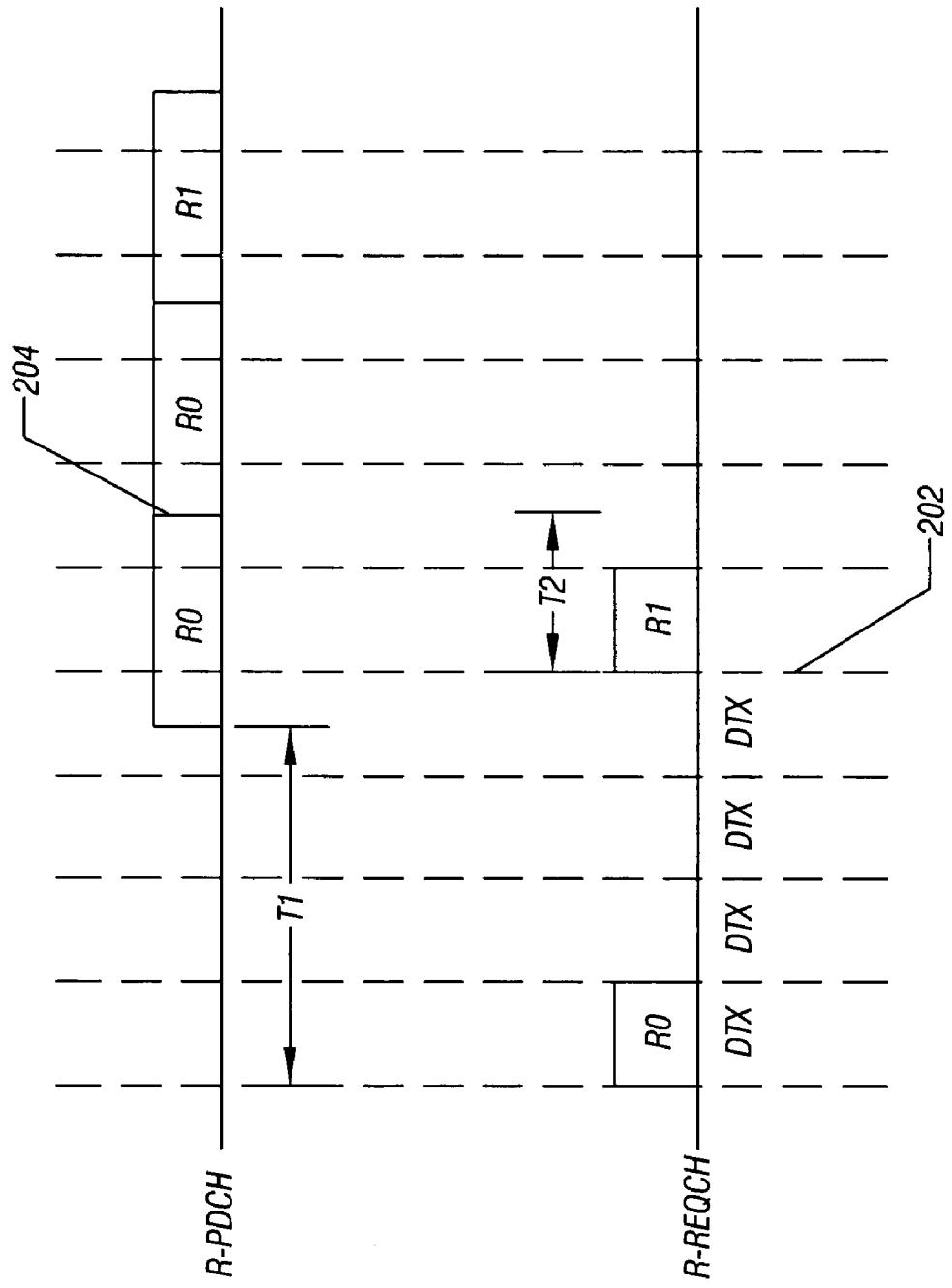
FIG. 3 is a timing diagram to illustrate timing relationships between reverse request channel (R-REQCH) messages and frames transmitted on a reverse packet data channel (R-PDCH), in accordance with an embodiment.

A further rule that is adhered to by mobile stations according to some embodiments is that the data rate transmitted in a particular 10-ms (millisecond) period is based on the latest data rate reports (e.g., R0 or R1 shown in FIG. 3). The data rate reports are sent at least a time offset T1 prior to the transmission of the R-PDCH frame corresponding to the requested data rate. The time offset T1 provides sufficient time for the scheduler 40 to process the information communicated in R-REQCH so that appropriate scheduling can be performed.

The time offset T2 between the data rate reported in the reverse request channel R-REQCH and the data rate transmitted on R-PDCH allows time for the scheduler 40 in the base station 19 to provision for the amount of ROT (rise-over-thermal) or load in the reverse wireless link that is occupied by users transmitting in autonomous mode. The remaining ROT or load available in the air interface is assigned to scheduled mode mobile stations.

ROT, or rise-over-thermal, is defined as the ratio of total interference over thermal noise power. ROT is basically a measure of the loading of the reverse wireless link. In other implementations, other measures of loading of the reverse wireless link can be used.

The scheduler 40 can also control the ROT or load of the reverse wireless link by setting values for the parameter REV_PDCH_MAX_AUTO_TPR$_S$ for the mobile stations in a cell or cell sector that are capable of transmitting in autonomous mode. To reduce the loading of the reverse wireless link, the scheduler 40 can reduce REV_PDCH_MAX_AUTO_TPR$_S$ for each mobile station. Reducing the loading of autonomous load transmissions provides greater bandwidth for other forms of transmissions in the reverse wireless link, such as scheduled mode transmissions.

Instructions of the various software modules discussed herein (such as the scheduler 40 and other software executable in base station 19 or mobile station 16) are loaded for execution on corresponding control units or processors, such as the processor 42 in the mobile station and the processor 48 in the MSC base station 19. The control units or processors include microprocessors, microcontrollers, processor modules or subsystems (including one or more microprocessors or microcontrollers), or other control or computing devices. As used here, a "controller" refers to hardware, software, or a combination thereof. A "controller" can refer to a single component or to plural components (whether software or hardware).

Data and instructions (of the various software modules) are stored in one or more machine-readable storage media, such as storage 44 in the mobile station 16 and storage 50 in the base station 19. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

The instructions of the software routines or modules are loaded or transported to a system in one of many different ways. For example, code segments including instructions stored on floppy disks, CD or DVD media, a hard disk, or transported through a network interface card, modem, or other interface device are loaded into the system and executed as corresponding software routines or modules. In the loading or transport process, data signals that are embodied in carrier waves (transmitted over telephone lines, network lines, wireless links, cables, and the like) communicate the code segments, including instructions, to the system. Such carrier waves are in the form of electrical, optical, acoustical, electromagnetic, or other types of signals.

While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method of communicating data in a wireless communications network, comprising:
    communicating, between a mobile station and base station, an indicator of an autonomous data rate supportable over a reverse wireless link between the mobile station and the base station, wherein the mobile station is involved in plural sessions corresponding to plural services;
    communicating, between the mobile station and the base station, a first flag indicating whether autonomous mode is enabled for a first one of the services:
    in response to the first flag indicating that autonomous mode is enabled, communicating, over the reverse wireless link, data at a data rate less than or equal to the autonomous data rate without the base station having to first schedule the mobile station; and
    communicating at least a second flag indicating whether autonomous mode is enabled for at least a second one of the services.

2. The method of claim 1, further comprising:
    the mobile station autonomously sending data associated with the first service in response to detecting that the first flag indicates that autonomous mode is enabled for the first service; and the mobile station autonomously sending data associated with the second service in response to detecting that the second flag indicates that autonomous mode is enabled for the second service.

3. The method of claim 2, wherein the mobile station autonomously sends data associated with the first service at a data rate that is less than or equal to the autonomous data rate, and wherein the mobile station autonomously sends data associated with the second service at a data rate that is less than or equal to the autonomous data rate.

4. The method of claim 1, wherein communicating the first flag comprises communicating the first flag having a state to indicate that autonomous mode is disabled for the first service, and wherein communicating the second flag comprises communicating the second flag having a state to indicate that autonomous mode is enabled for the second service.

5. The method of claim 1, wherein communicating the data comprises communicating packet data over a reverse packet data channel (R-PDCH in a code-division multiple access (CDMA) wireless communications network.

6. The method of claim 5, wherein communicating the indicator comprises communicating a REV_PDCH_MAX_AUTO_TPR$_s$ parameter.

7. The method of claim 6, wherein communicating the flag comprises communicating a REV_PDCH_AUTO_ALLOWED$_s$[i] parameter.

8. A method of communicating data in a wireless communications network, comprising:

communicating, between a mobile station and base station, an indicator of an autonomous data rate supportable over a reverse wireless link between the mobile station and base station;

communicating, between the mobile station and base station, a flag indicating whether autonomous mode is enabled for the mobile station;

in response to the flag indicating that autonomous mode is enabled, communicating, over the reverse wireless link, data at a data rate less than or equal to the autonomous data rate without the base station having to first schedule the mobile station, wherein communicating the data comprises communicating packet data over a reverse packet data channel (R-PDCH) in a code-division multiple access (CDMA) wireless communications network, wherein communicating the indicator comprises communicating a REV_PDCH_MAX_AUTO_TPR$_s$ parameter;

communicating, between the mobile station and the base station, data according to plural services over the reverse wireless link;

communicating REV_PDCH_AUTO_ALLOWED$_s$[i] parameters where i is equal to a range of values corresponding to the plural services, wherein the flag is one of the REV_PDCH_AUTO_ALLOWED$_s$[i] parameters, and wherein the REV_PDCH_AUTO_ALLOWED$_s$[i] parameters indicate whether autonomous mode is enabled for respective ones of the plural services.

9. The method of claim 1, further comprising communicating, in the reverse wireless link, a message indicating a maximum supportable data rate of the mobile station a predetermined time offset prior to communicating data corresponding to the message.

10. The method of claim 9, further comprising scheduling communications for other mobile stations based at least in part on the message indicating the maximum supportable data rate.

11. The method of claim 1, wherein communicating the indicator and flag comprises communicating the indicator and flag in at least one of an Extended Channel Assignment Message. a Service Connect Message, and a Universal Handoff Direction Message.

12. An article comprising at least one computer-readable storage medium encoded with computer-executable instructions that when executed cause a base station in a wireless communications network to:

communicate, in a forward wireless link, an indicator of an autonomous data rate supportable over a reverse wireless link between a mobile station and the base station, wherein the mobile station is involved in plural sessions corresponding to plural services;

communicate, in the forward wireless link, a first flag indicating whether autonomous mode is enabled for a first one of the services;

in response to the first flag indicating that autonomous mode is enabled, perform autonomous communication over the reverse wireless link between the mobile station and the base station at a data rate less than or equal to the autonomous data rate without the base station having to first schedule the mobile station; and communicate at least a second flag indicating whether autonomous mode is enabled for at least a second one of the services.

13. The article of claim 12, wherein the instructions when executed cause the base station to communicate packet data in autonomous mode over a reverse packet data channel (R-PDCH) in a code-division multiple access (CDMA) wireless communications network.

14. The article of claim 13, wherein the indicator comprises a REV_PDCH_MAX_AUTO_TPR$_s$ parameter.

15. The article of claim 14, wherein the first flag comprises a REV_PDCH_AUTO_ALLOWED$_s$[i] parameter.

16. A base station for use in a wireless communications network, comprising:

an interface to transmit to a first mobile station an indicator of an autonomous data rate supportable over a reverse wireless link between the first mobile station and base station, wherein the first mobile station is involved in plural sessions corresponding to plural services, the interface to further transmit to the first mobile station a first flag indicating whether autonomous mode is enabled for a first one of the services, the first flag being separate from the indicator, and the interface to further transmit at least a second flag indicating whether autonomous mode is enabled for at least a second one of the services;

a scheduler to schedule transmission of data by mobile stations; and a controller to receive data transmitted by the first mobile station in autonomous mode in response to the first flag being enabled without the scheduler having to schedule transmission by the first mobile station, the received data communicated over the reverse wireless link at a data rate less than or equal to the autonomous data rate.

17. A mobile station for use in a wireless communications network, comprising:

an interface to receive an indicator of an autonomous data rate supportable over a reverse wireless link between the mobile station and a base station, wherein the mobile station is involved in plural sessions corresponding to plural services, the interface to further receive a first flag indicating whether autonomous mode is enabled for a first one of the services, and to receive at least a second flag indicating whether autonomous mode is enabled for a second one of the services; and a controller to transmit data over the reverse wireless link in autonomous mode in response to the first flag being enabled, the controller to transmit the data over the reverse wireless link at a data rate less than or equal to the autonomous data rate.

18. The mobile station of claim 17, wherein the controller is adapted to transmit packet data over a reverse packet data channel (R-PDCH) in a code-division multiple access (CDMA) wireless communications network.

19. The mobile station of claim 18, wherein the indicator comprises a REV_PDCH_MAX_AUTO_TPR$_s$ parameter.

20. The mobile station of claim 19, wherein the first flag comprises a REV_PDCH_AUTO_ALLOWED$_s$[i] parameter.

21. The method of claim 1, wherein the communicating tasks are performed by the mobile station.

22. The method of claim 1, wherein the communicating tasks are performed by the base station.

* * * * *